Feb. 19, 1963 M. H. KNOCH 3,077,879
CONTRACEPTIVE INTRA-UTERINE APPLIANCE
Filed Feb. 24, 1961
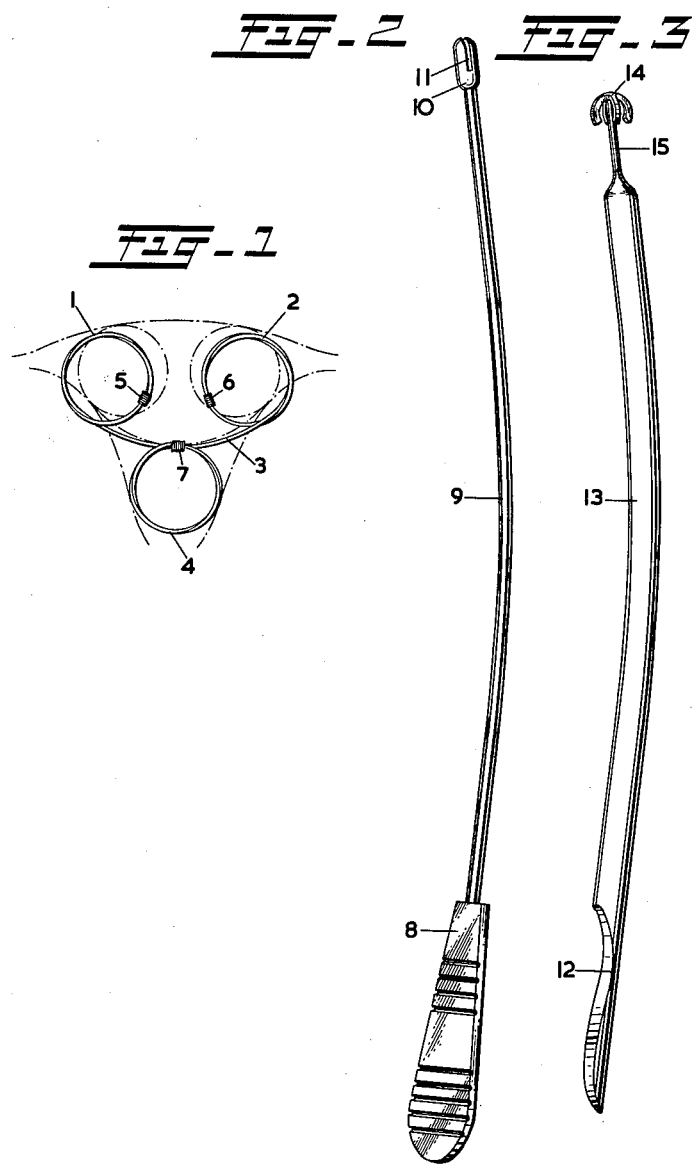
INVENTOR
MAX HERMANN KNOCH
BY Hammond & Littell
ATTORNEYS United States Patent Office 3,077,879
Patented Feb. 19, 1963

3,077,879
CONTRACEPTIVE INTRA-UTERINE APPLIANCE
Max Hermann Knoch, 37 Albisstrasse, Thalwil, near Zurich, Switzerland
Filed Feb. 24, 1961, Ser. No. 91,442
Claims priority, application Netherlands Feb. 27, 1960
4 Claims. (Cl. 128—130)

This invention relates to a contraceptive intra-uterine appliance.

Such appliances in the shape of a single ring are known. Such rings consist of metal or of silk worm thread. Metallic rings often consist of a thread wound to a helical shape and closed to form the ring.

Silk worm rings in general consist of more than one thread or wire, twisted together to a single ring. The ends of the wires are provided with a small knot loop to restrict the possibility of damage to the surrounding tissue, which could easily happen with freely protruding, rather sharp ends, and to prevent ejection of the ring from the uterine cavity, which could easily happen with a smooth ring.

Such known rings have not given entirely satisfactory results. Often they could be introduced with difficulty and with much risk of damage, injury and infection, they frequently did not give the desired effect and after insertion they have more than once given injuries and nervous disturbances.

The present invention aims at improving such an appliance, and to this end it is characterized in that it comprises two circular rings connected elastically, which rings in essence do not overlap and are positioned in the same plane.

The two rings each cover the entry to an oviduct and this has appeared to be quite effective. By the elastic rings and the elastic connection the appliances adapt themselves correctly to deviations in shape and dimensions of uterine cavities, while they follow changes in shape and dimensions for the same person entirely while maintaining a good cover of the oviducts.

Preferably an appliance according to the invention is further characterized in that it comprises a third circular ring with its centre on the centre perpendicular line of the two other rings, connected to said other rings and positioned substantially in the same plane with them.

In this case the third ring acts as a part which determines the position of the other rings and moreover this third ring forms a quite effective additional barrier for the passage of spermatozoa and peritoneal liquid.

Thus the effect obtained is complete and the disadvantages of known rings as described above are entirely avoided.

Preferably the rings consist of silk worm thread, as well as the connection between said rings, the ends of the wires, from which the appliances are made, being preferably cast off by a thin wire of a precious metal such as gold.

The invention will now be explained further with reference to the enclosed drawing. In said drawing:

FIGURE 1 is a view of an appliance according to the invention;

FIGURE 2 is a view of a tool to insert such an appliance, and

FIGURE 3 is a tool to remove such an appliance from the uterine cavity.

The appliance according to FIGURE 1 comprises two rings 1 and 2 connected by a connecting part 3 tangential to said rings, a third ring 4 having been connected with a point of its periphery in the centre of said connecting part. The centre of the ring 4 is on the centre perpendicular line between the centres of the rings 1 and 2, so that the three centres together take up the position of the corners of an isosceles triangle, and preferably in many cases an equilateral triangle. The rings are substantially of the same diameter and they are positioned in the same plane.

As appears from FIGURE 1 the rings consist of silk worm thread which is substantially in all points double and in those parts in which the thread is double the two threads have been twisted together.

The thread which constitutes the rings 1 and 2 begins at 5, extends almost two times around in order to constitute the ring 1 and then changes into the connecting part 3. The end of said thread is found at 6 and the beginning and the end of the thread are cast off by winding around the two threads at said ends a thin wire of gold. At 7 the ring is connected to the connecting part 3, also with the aid of a gold wire.

The thin silk worm thread used for such an appliance gives so much elasticity, that the rings 1, 2 and 4 are somewhat elastic, while the connecting part 3, which only consists of one thickness of wire, and which has a different shape, has a higher elasticity than the rings.

FIGURE 1 shows by dot and dash lines the walls of the uterine cavity and the manner in which the appliance will be positioned therein. At the upper left and right the openings of the oviducts are shown. Particularly by the elastic connecting part 3 the rings adapt themselves in position to deviations in the dimensions of the uterine cavity, while, because the rings themselves also have some elasticity, their shape adapts itself entirely to the particular situation. It appears clearly from FIGURE 1 that the rings 1 and 2 could become positioned somewhat closer together in the uterine cavity by bending of the part 3 under the influence of the shape and dimensions of the adjacent walls in the uterine cavity.

For introducing such an appliance a tool could be used as shown in FIGURE 2, with a handle 8, a rod 9 and a head 10 in which a slot 11 has been provided. The rings 1 and 2 are moved towards one another so that they overlap by bending the connecting part 3 and said rings are thereupon introduced with their upper part into the slot 11 with the same position of the appliance as shown in FIGURE 1. Thus this appliance could easily be introduced into the body of the person without much resistance being encountered and without the chance of injury.

To remove the appliance a tool could be used as shown in FIGURE 3 with a handgrip 12, a rod 13 and a hook-shaped head 14 provided at the end of a thinner part 15. The rod 13 has about the same outer diameter as the hook-shaped part 14, so that a sufficiently wide opening is left free when removing the appliance from the body in order to prevent that the head 14 hooks into the body of the person.

With the present development of the art of plastics and other synthetic materials it is not impossible that such appliances may be manufactured now or in future from a thermoplastic material, so that the small wires of precious metal could be omitted and the ends of the wire or wires could be cast off by heat sealing e.g., and it is also possible that other metals for casting off the wires are imaginable for different synthetic materials.

What I claim is:

1. A contraceptive intra-uterine appliance comprising two circular rings of equal radius elastically connected by a connecting part, said two rings being positioned on the same side of said connecting part and in essence not overlying, and a third circular ring tangentially connected to said connecting part with its center perpendicular to the midpoint of a line connecting the centers of said two circular rings and on the opposite side of said connecting part from said two circular rings, all of said circular rings being positioned in the same plane, whereby said rings together with said elastically connecting part are adapted to correct to deviations in shape and dimension of the uterine cavity and to maintain contact with the oviducts.

2. Appliance according to claim 1, characterized in that each ring consists of more than one winding of thin silk worm thread, twisted together.

3. Appliance according to claim 1, characterized in that it consists of silk worm thread, cast off by winding a thin wire of a precious metal around it.

4. A contraceptive intra-uterine appliance comprising two circular rings of equal radius elastically connected by a connecting part, said two rings being positioned on the same side of said connecting part and in essence not overlapping, said two rings and said connecting part consisting of a single wire having its ends at approximately the points of contact of said rings with said connecting part, said wire extending one turn through each of the entire rings and thereafter extending at least one further turn through each of the rings to said point of contact and thereafter extending through said connecting part, and a third circular ring of radius equal to said two circular rings tangentially connected to said connecting part with its center perpendicular to the midpoint of a line connecting the centers of said two circular rings and on the opposite side of said connecting part from said two circular rings, said third circular ring consisting of more than one winding of wire twisted together, all of said circular rings being positioned in the same plane whereby said rings together with said elastically connecting part are adapted to correct to deviations in shape and dimension of the uterine cavity and to maintain contact with the oviducts.

References Cited in the file of this patent
FOREIGN PATENTS 461,348    Great Britain _____ Feb. 15, 1937

OTHER REFERENCES

Stein: "Contraceptive Methods," Jour. A.M.A., April 8, 1939, pp. 1311–1314, pp. 1313–1314 relied upon.

Ishihama: Yokahama Medical Bulletin, vol. 10, April 1959, pp. 89–105, page 101, FIGURE 11 relied on.

UNITED STATES PATENT OFFICE
CERTIFICATE OF CORRECTION

Patent No. 3,077,879          February 19, 1963

Max Hermann Knoch

It is hereby certified that error appears in the above numbered patent requiring correction and that the said Letters Patent should read as corrected below.

Column 1, line 24, after "could" insert -- only --; column 2, line 70, for "overlying" read -- overlapping --.

Signed and sealed this 12th day of November 1963.

(SEAL)
Attest:
ERNEST W. SWIDER

Attesting Officer

EDWIN L. REYNOLDS

Acting Commissioner of Patents